US006778224B2

(12) United States Patent
Dagtas et al.

(10) Patent No.: US 6,778,224 B2
(45) Date of Patent: Aug. 17, 2004

(54) ADAPTIVE OVERLAY ELEMENT PLACEMENT IN VIDEO

(75) Inventors: Serhan Dagtas, Croton-On-Hudson, NY (US); Mohamed Abdel-Mottaleb, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 459 days.

(21) Appl. No.: 09/888,804

(22) Filed: Jun. 25, 2001

(65) Prior Publication Data

US 2002/0196370 A1 Dec. 26, 2002

(51) Int. Cl.$^7$ .................................................. H04N 9/74
(52) U.S. Cl. ...................... 348/586; 348/584; 348/589; 348/598; 345/723
(58) Field of Search ................................ 348/586, 588, 348/589, 564, 596, 565, 600, 584; 345/723, 641, 640, 638, 629; H04N 9/74

(56) References Cited

U.S. PATENT DOCUMENTS

| 4,998,171 A | * | 3/1991 | Kim et al. ................... 348/565 |
| 5,561,471 A | | 10/1996 | Kim et al. |
| 5,953,076 A | * | 9/1999 | Astle et al. ................. 348/584 |
| 6,373,530 B1 | * | 4/2002 | Birks et al. ................. 348/584 |
| 6,381,362 B1 | * | 4/2002 | Deshpande et al. ......... 382/162 |
| 6,573,945 B1 | * | 6/2003 | Wu et al. .................... 348/584 |
| 6,597,818 B2 | * | 7/2003 | Kumar et al. ............... 382/294 |
| 2001/0048481 A1 | | 12/2001 | Hatano et al. .............. 348/473 |

FOREIGN PATENT DOCUMENTS

| EP | 0700211 A2 | 3/1996 |
| EP | 1022898 A2 | 7/2000 |
| JP | 07274140 A | 10/1995 |
| JP | 08289253 A | 1/1996 |
| JP | 11168702 A | 6/1999 |

OTHER PUBLICATIONS

Abdel–Mottaleb et al.; Face Detection in Complex Environments From Color Images; Fifth International Conference on Image Processing; ICIP–99, Kobe, Japan; Oct., 1999; pp. 1–5.

PHA 23,569, U.S. Ser. No. 09/210,415, filed: Dec. 11, 1998. "Automatic Measurement of Intensity of Motion Activity of Video Segments", by K.A. Peker et al, Proc. SPIE Vo. 4315, pp. 341–351.

* cited by examiner

Primary Examiner—Michael H. Lee
Assistant Examiner—Trang U. Tran
(74) Attorney, Agent, or Firm—Laurie Gathman

(57) ABSTRACT

A method for placing overlay elements in images of a digital video so that desirable viewing areas of the images are not occluded by the overlay element, the method includes extracting frames from the video, each of the frames defining an image which may have one or more desirable viewing areas. For each frame, an area is selected in the image for placing an overlay element and the percentage the overlay element overlaps the desirable viewing areas is determined for the selected area. The overlay element is placed in the selected area if the percentage is below a maximum allowed predetermined percentage of overlapping. If it is not, one or more other areas in the image are selected and/or the size, shape, aspect ratio of the overlay element is changed until a position and/or size, shape, aspect ratio is found which minimizes occlusion of the desirable viewing areas in the image. Further, a device, such as a video receiver or video transmitter, for placing an overlay element in images of a digital video so that desirable viewing areas of the images are not occluded by the overlay element. In such a device, a frame extractor extracts frames from the video, each of the frames defining an image having at least one desirable viewing area. An image processor analyzes the images of the frames to identify desirable viewing areas in the images of the frames. An overlay element locator places the overlay element in the images of the frames in a manner which minimizes the occlusion of the desirable viewing areas.

34 Claims, 4 Drawing Sheets

ADAPTIVE OVERLAY ELEMENT PLACEMENT IN VIDEO

FIELD OF THE INVENTION

This invention relates to television systems. Specifically, this invention relates to methods and devices for adaptively placing overlay elements in videos.

BACKGROUND OF THE INVENTION

During the production and display of television broadcasts, the images of the video can have various elements overlaid across areas thereof. A typical example of such an overlay element is a closed captioning window, which is usually positioned on the bottom or top of the image. Other overlay elements may include captions for the displayed persons, scoreboards, news tickers, logos etc.

The exact location of the overlay element in the image is usually random and often blocks areas of the image that may be highly desired by viewers to see, such as text or human faces. This is due to the fact that in the analog domain, there are no practical techniques for detecting semantic features and adaptively adjusting the placement of the overlay element in the images.

Consequently, in the case of a closed captioning window, the placement thereof at the bottom or the top of the image is currently made in a manual selection process. As a result, especially in live broadcasts, the closed captioning window or other overlay material or objects is often overlaid across desirable areas of the image thereby occluding (blocking) the same.

Methods and devices are, therefore, needed for adaptively placing overlay elements in images of videos so that the desirable areas of the images are not occluded thereby.

SUMMARY OF THE INVENTION

In accordance with one aspect of the invention, a method for placing overlay elements in images of a digital video so that desirable viewing areas of the images are not occluded thereby, comprises extracting frames from the video, each of the frames defining an image which may have one or more desirable viewing areas which may be identified by detecting face or text, or measuring motion activity in different areas of the frames. For each frame, an area is selected in the image for placing the overlay element and the percentage the overlay element overlaps the desirable viewing areas is determined for the selected area. The selected area may be a randomly selected position in one of a plurality of predetermined positions. The overlay element is placed in the selected area if the percentage is below a maximum allowed predetermined percentage of overlapping. If it is not, one or more other areas in the image are selected and evaluated as described above until an area is found which minimizes occlusion of the desirable viewing areas in the image. These other areas may be one of the other predetermined positions or positions selected using some other selection scheme. Alternatively, the occlusion can be minimized by changing the size, shape, aspect ratio, and/or the like of the overlay element instead of changing its position in the frame. Additionally, occlusion can be minimized by changing the position of the overlay element while simultaneously changing the size, shape, aspect ratio, and/or the like of the overlay element.

In accordance with another aspect of the invention, a device, such as a video transmitter or video receiver, for placing an overlay element in images of a digital video so that desirable viewing areas of the images are not occluded by the overlay element, comprises a frame extractor for extracting frames from the video, each of the frames defining an image which may have at least one desirable viewing area that may be identified by detecting face or text, or measuring motion activity in different areas of the frames. An image processor analyzes the images of the frames to identify desirable viewing areas in the images of the frames. An overlay element locator places the overlaid element in the images of the frames in a manner which minimizes the occlusion of the desirable viewing areas.

BRIEF DESCRIPTION OF THE DRAWINGS

The advantages, nature, and various additional features of the invention will appear more fully upon consideration of the illustrative embodiments now to be described in detail in connection with accompanying drawings wherein.

DETAILED DESCRIPTION OF THE INVENTION

The present invention is a method and device for adaptively placing an overlay element, such as a closed captioning window, in an image of a video so that image areas of substantial interest to viewers are not occluded by the overlay element. For purposes of describing the principles of the present invention, the desirable image areas discussed herein will include face and text. It should be understood, however, that the present invention is equally applicable to other image areas of interest in video images.

In addition to a closed captioning window, the overlay element can include on screen commands, channel identification information, or any other element (typically textual in nature) that is overlaid across video images displayed by display devices such as television receivers. The present invention is also applicable to television broadcast systems, which overlay elements such as captions for displayed persons, scoreboards, stock and news tickers, logos and other images in the video data stream to be broadcasted.

Adaptive placement of overlay elements can be accomplished using conventional face and text detection techniques that detect face and text image areas (or other desirable image areas) in representative frames of temporal video segments. Adaptive placement of overlay elements can also be accomplished using conventional motion measuring techniques which measure motion activity in different areas in representative frames of temporal video segments. Such a technique is described by K. Peker and A. Divakaran in "Automatic Measurement of Intensity of Motion Activity of Video Segments," Proc. SPIE Conference on Storage and Retrieval from Multimedia Databases, San Jose, Calif., January 2001, and in U.S. patent application Ser. No. 09/210,415, entitled "Method for Detecting a Face in a Digital Image", filed on Dec. 11, 1998 by Mohamed Abdel- Mottaleb et al., the disclosures of which are incorporated herein by reference. In accordance with this motion-based technique, an area with less motion activity will typically be preferred for an overlay element over an area with high motion activity. The motion activity can be calculated either in the compressed MPEG domain or in the uncompressed domain. For compressed video, the motion activity in an area can be calculated as the standard deviation of the magnitude of the motion compensated vectors in that area. For uncompressed video, the motion activity in an area can be ascertained using optical flow.

The desirable image area data obtained with the above detection methods is then used in the present invention for determining the best manner for placing the overlay element in the frames, i.e., the manner of placement which minimizes the occlusion of the desirable image areas of the frames.

Figure 1:
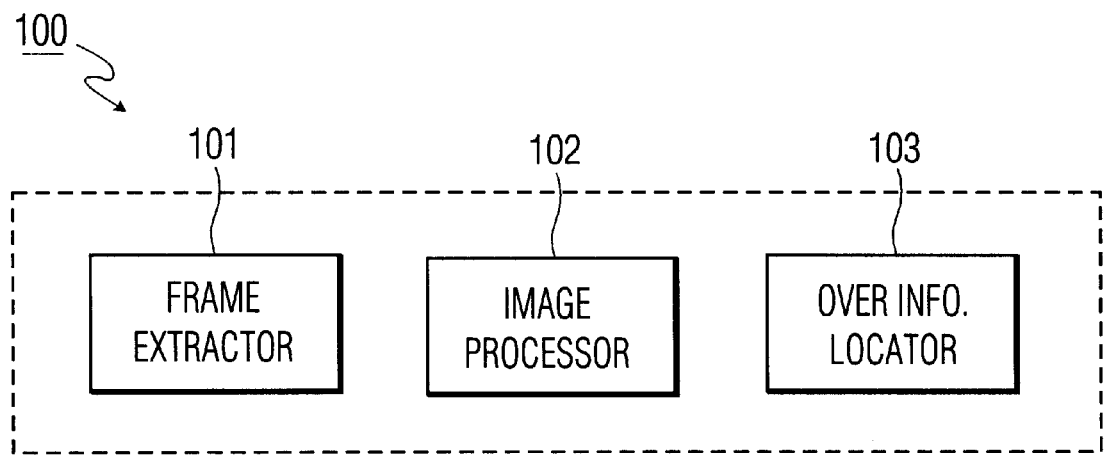
FIG. 1 is a block diagram of an overlay element positioning device according to an embodiment of the present invention.

Referring now to the drawings and initially to the block diagram of FIG. 1, there is shown a device 100 according to an embodiment of the present invention for minimizing the occlusion of desirable image areas by overlay elements in videos. The device 100 includes a frame extractor 101, an image processor 102 and an overlay element window locator 103. The frame extractor 101 extracts representative frames from temporal video segments of the video. The image processor 102 utilizes conventional detection techniques, such as the earlier described face and/or text detection techniques or the motion-based detection techniques, to analyze the frames and identify suitable areas in the frames for placing the overlay element. The overlay element locator 103 uses the image area data to place the overlay element in the frames in a manner which minimizes the occlusion of desirable image areas in the frames.

Figure 2:
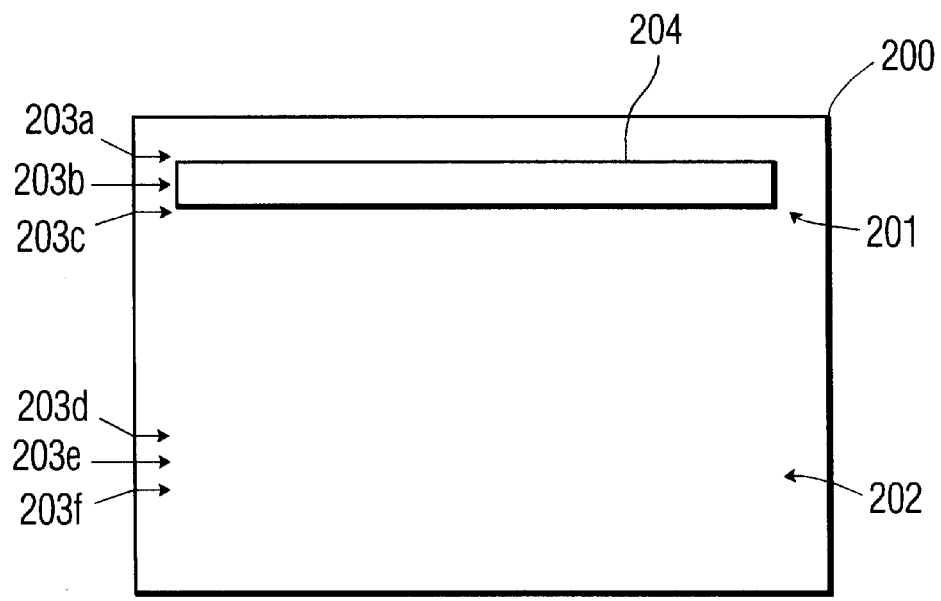
FIG. 2 is a representative frame of a temporal video segment processed according to the present invention.

FIG. 2 is an exemplary frame 200 showing six typical locations or positions 203a–203f for an overlay element 204, which may comprise a closed captioning window with one or more lines (a one line closed captioning window is shown). The arrows 203a–203c in the upper candidate area 201 represent three of these locations and arrows 203d–203f in the lower candidate area 202 represent the other three of these locations of the frame 200. The locations 203a–203f represent predetermined positions that can be used for adaptively placing an overlay element 204 to minimize the occlusion of desirable image areas in the frame 200. Note that other locations in the frame 200 may be used for the overlay element 204. As shown, the overlay element 204 is located in location 203b of the upper candidate area 201. The best one of these six positions is selected in accordance with the principles of the present invention by computing an occlusion_rate for each of the positions and ranking the positions according to their occlusion_rates. The occlusion rate is the percentage that closed captioning window 204 overlaps the desirable image area or areas of the frame image. The position with the lowest possible occlusion_rate and that avoids noticeably sudden frame-to-frame movements of the closed captioning window is selected for positioning the same.

The candidate positions for the overlay element can be selected in an alternative manner, without the use of a set of predetermined positions. For example, in another embodiment of the invention, the candidate positions can be located by starting at a first position in the image and shifting the position of the overlay element a certain amount until a position which minimizes the occlusion of the desirable image areas in the frame is found. It should be noted that the candidate overlay element positions can be defined anywhere in the image. For example, the overlay element positions can be located on the sides of the images or under the persons in the image who are talking.

In other embodiments of the invention, occlusion can be minimized by changing the size, shape, aspect ratio, and/or the like of the overlay element instead of changing its position in the frame. In still other embodiments of the invention, occlusion can be minimized by changing the position of the overlay element while simultaneously changing the size, shape, aspect ratio, and/or the like of the overlay element.

The above method is performed on the representative frame of each temporal video segment of the video. Frame-to-frame position changes within each of the upper or lower candidate areas can be done incrementally using any suitable buffering technique which is capable of smoothing out the position changes and making them appear fluid and continuous so that the overlay element does not undesirably appear to be jumping or suddenly moving between the positions in the image. One exemplary buffering technique that can be used for smoothing the position, sizing, shaping and/or aspect ratio changes comprises interpolating between two positions, sizes, shapes, and/or aspect ratios over a period of time.

Figure 3:
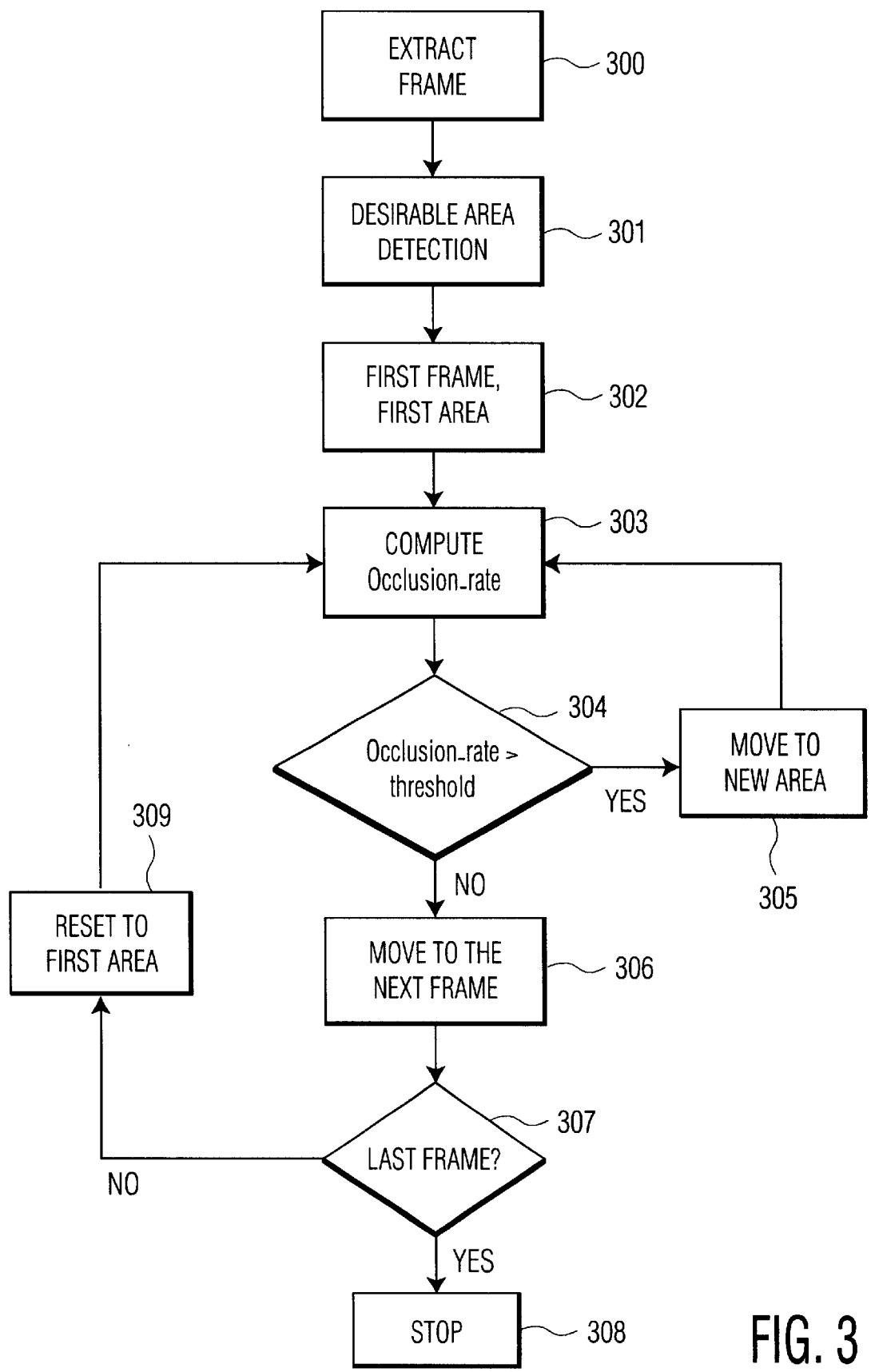
FIG. 3 is a flow chart illustrating a method according to an embodiment of the present invention.

FIG. 3 is a flow chart illustrating the method of the present invention, as may be performed by the device of FIG. 1. In step 300, a representative frame for a temporal video segment of a video of interest (key frame) is extracted. Desirable area detection is performed in step 301 to obtain data pertaining to the location in the image that contains desirable viewing areas in order to identify suitable areas in the frames for placing the overlay element. In the case of face and or text detection, if the digital video stream has been processed in accordance with MPEG 4 or MPEG 7, face and/or text data may already be available, therefore, step 301 may be omitted.

In step 302, a first area in the frame for the overlay element in terms of position, size, shape, aspect ratio, and/or the like is selected for evaluation. In step 303, the data pertaining to the location of the desirable image areas is used to determine the occlusion rate for the first area. The occlusion_rate of image areas that consist of more than one type of desirable image feature, for example face and text, or high motion activity, can be determined by calculating a combination occlusion_rate using the equation:

$$\text{combination occlusion\_rate} = C1*\text{feature 1\_occlusion} + C2*\text{feature 2\_occlusion} + C3*\text{feature 3\_motion activity level}$$

where:

C1 is a coefficient or weight factor that pertains to the importance of the feature 1 (face) areas of the image;

feature 1_occlusion is the percentage of overlap of the feature 1 areas by the current location of the overlay element;

C2 is a coefficient or weight factor that pertains to the importance of the feature 2 (text) areas of the image;

feature 2_occlusion is the percentage of overlap of the feature 2 areas by the current location of the overlay element; and C3 is a coefficient or weight factor that pertains to the importance of the feature 3 (high motion activity) areas of the image.

The use of coefficients C1, C2, and C3 provide flexibility in assigning an importance to the feature 1 (face), feature 2 (text), and feature 3 (motion activity) occlusion data. If the desirable image area is only face or text, for example, then just the percentage that the overlay element overlaps the face or text image in the frame need to be calculated.

In step 304, it is determined whether the occlusion_rate for the first overlay element area is greater than an acceptable predetermined threshold occlusion_rate. If so, in step 305 the area for the overlay element is incrementally shifted to a new area and steps 303 and 304 are performed for the new area. The shifting to a new area can be done using the predetermined list as shown in FIG. 2 or by shifting, scaling, or rotating the current area. This process is continued until an area which minimizes the occlusion of desirable image areas in the frame is found. The area changes are made such that frame-to-frame abruptness that may be irritating to the viewer is avoided as described earlier.

Once the overlay element has been suitably placed in the frame, in step 306 a next representative frame is selected for processing. In step 307 it is determined whether the next frame is the last frame in the video for placing the overlay element. If it is, the method stops in step 308. If it is not, in step 309 the first area is selected in the next frame and steps 303, 304 and so forth are performed.

The principles of the present invention can be implemented in any type of video receiving device such as a television receiver, a television set top box, or a video cassette recorder to name a few. The principles of the invention can also be implemented in video transmitting devices, for example, equipment used in television broadcasting. Such implementations of the present invention can be made in software or in software and hardware.

Figure 4:
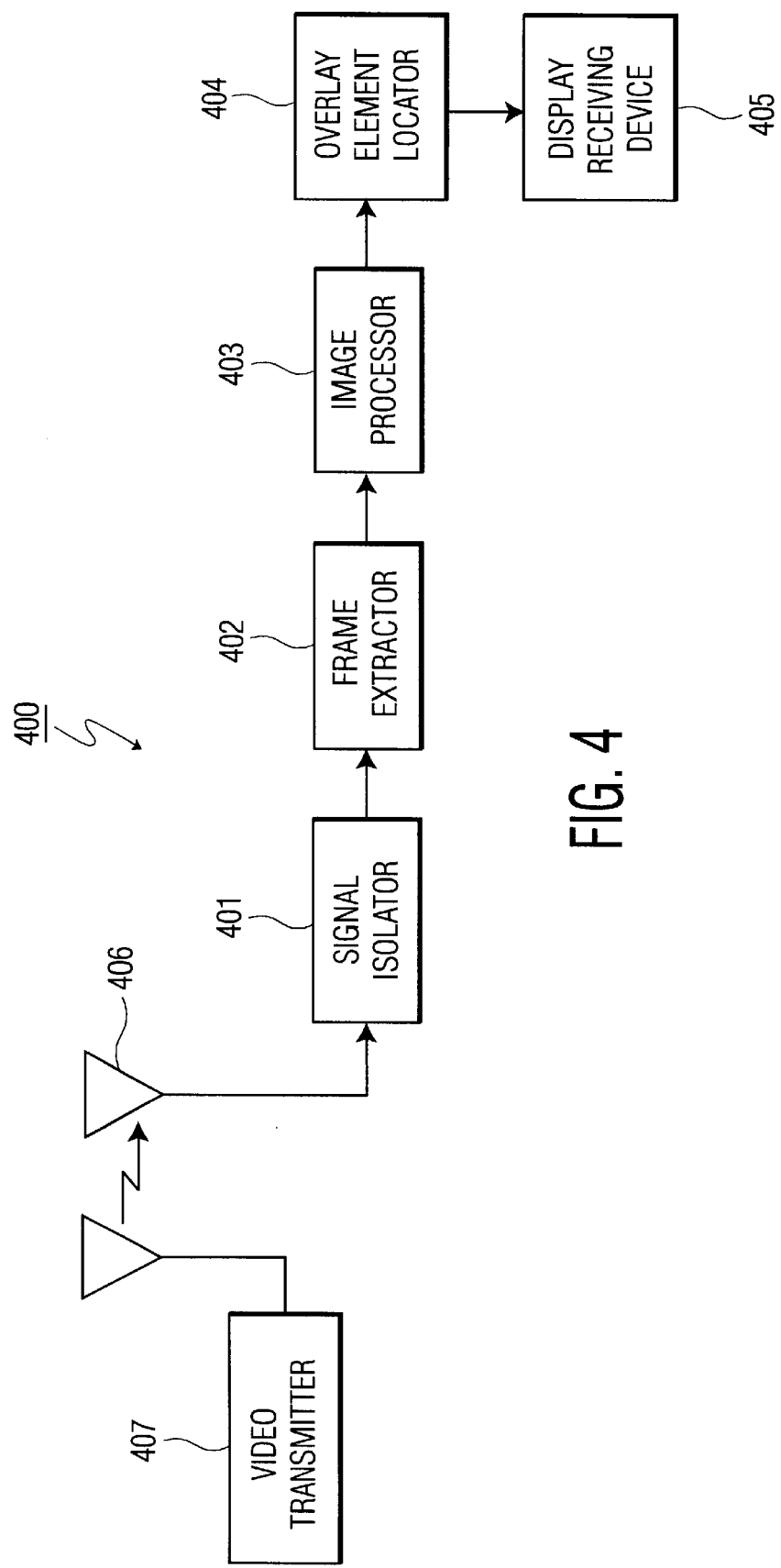
FIG. 4 is a block diagram of a video receiver device according to an embodiment of the present invention.

FIG. 4 illustrates an exemplary video receiver device, such as a television receiver or set-top-box, made according to the principles of the present invention. The receiver device 410 is adapted for receiving transmitted video signals, such as television broadcast signals, at least one of which includes a video and one or more overlay elements, transmitted from a conventional video transmitter 400, such as a television broadcast transmitter. The receiver device may include any suitable signal receiving means 406, such as an antenna, for receiving the video signals, a signal isolator 401 comprising a tunable receiving system, such as a television receiver, for isolating one video signal from the other video signals in the transmission. A frame extractor 402 is provided for extracting representative frames from temporal video segments of the video portion of the isolated signal. An image processor 403, utilizing conventional detection techniques, such as the earlier described face and/or text detection techniques or the motion-based detection techniques, analyzes the frames and identifies suitable areas in the frames for placing the overlay information element. An overlay element locator 404 uses the image area data to place the overlay element in the frames in a manner which minimizes the occlusion of desirable image areas in the frames. A display device 405 is provided for displaying the frames with the overlay element. The display device 405 may be the display screen of a television set, a computer monitor, a liquid crystal display, etc.

Figure 5:
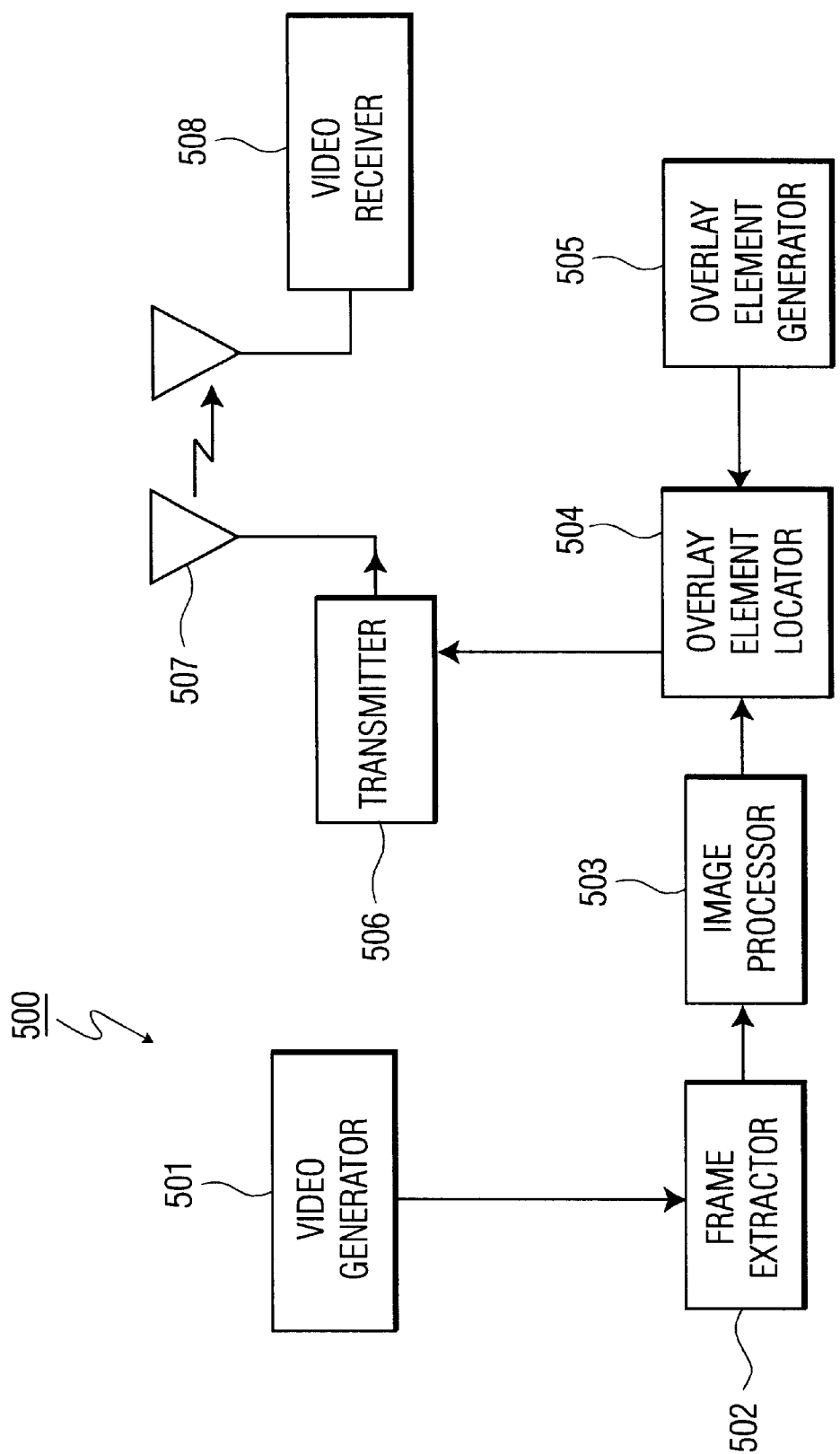
FIG. 5 is a block diagram of a video transmitter device according to an embodiment of the present invention.

FIG. 5 illustrates an exemplary transmitter device 500, such as a television broadcast transmitter, made according to the principles of the present invention. The transmitter device 500 is adapted for transmitting a video signal comprising video images with one or more overlay elements selectively placed therein so that desirable viewing areas of the images are not occluded by the one or more overlay elements. The transmitter device 500 includes a video generator 501 for generating a video comprised of video images. A frame extractor 502 extracts representative frames from temporal video segments of the video generated by the video generator 501. An image processor 503, utilizing conventional detection techniques, such as the earlier described face and/or text detection techniques or the motion-based detection techniques, analyzes the frames and identifies suitable areas in the frames for placing an overlay element. An overlay element generator 505 is provided for generating one or more overlay elements to be selectively placed in the images of the video. An overlay element locator 504 uses the image area data to determine the position to place the overlay element in the frames in a manner which minimizes the occlusion of desirable image areas in the frames. A conventional signal transmitter 506 coupled to a conventional transmission means 507, such as antenna, a cable distribution network, or a satellite network, transmits a video signal of the video with the overlay element(s) placed in the images thereof to one or more remotely located television receiver devices 508. The overlay element locator 504 determines the position and this information is transmitted along with the actual image data.

While the foregoing invention has been described with reference to the above embodiments, various modifications and changes can be made without departing from the spirit of the invention. Accordingly, such modifications and changes are considered to be within the scope of the appended claims.

What is claimed is:

1. A method for placing an overlay element in images of a digital video so that desirable viewing areas of the images are not occluded by the overlay element, the method comprising the steps of:
   a) extracting a frame from the video, the frame defining an image having at least one desirable viewing area;
   b) selecting an area in the image for placing an overlay element;
   c) determining for the selected area what percentage the overlay element overlaps the at least one desirable viewing area;
   d) selecting another area in the image for placing the overlay element if the percentage is above the maximum allowed predetermined percentage of overlapping and continuing on from step c).

2. The method according to claim 1, further comprising the step of placing the overlay element in the selected area if the percentage is below a maximum allowed predetermined percentage of overlapping.

3. The method according to claim 2, further comprising the step of extracting another frame from the video defining an image having at least one desirable viewing area and continuing on from step b).

4. The method according to claim 1, wherein the at least one desirable viewing area includes a face area.

5. The method according to claim 1, wherein the at least one desirable viewing area includes a text area.

6. The method according to claim 1, wherein the at least one desirable viewing area includes high motion activity areas.

7. The method according to claim 1, wherein the overlay element is selected from the group consisting of closed captioning, on screen commands, channel identification information, captions for displayed persons, scoreboards, stock and news tickers, logos and other images not originally in the video.

8. The method according to claim 1, wherein between steps b) and c) further comprising the step of obtaining location data about the at least one desirable viewing area in the image of the frame and using the data in step c) for determining the percentage the overlay element overlaps the at least one desirable viewing area.

9. A device for placing an overlay element in images of a digital video so that desirable viewing areas of the images are not occluded by the overlay element, the device comprising:
- a frame extractor for extracting frames from the video, each of the frames defining an image having at least one desirable viewing area;
- an image processor for analyzing the images of the frames to identify desirable viewing areas in the images of the frames; and
- an overlay element locator for selecting an area in the image for placing the overlay and if the area occludes a threshold amount of desirable viewing areas then selecting another area of the image which minimizes the occlusion of the desirable viewing areas.

10. The device according to claim 9, wherein the at least one desirable viewing area includes a face area.

11. The device according to claim 9, wherein the at least one desirable viewing area includes a text area.

12. The device according to claim 9, wherein the at least one desirable viewing area includes high motion activity areas.

13. The device according to claim 9, wherein the image processor measures motion activity in different areas of the frame.

14. The device according to claim 9, wherein the overlay element is selected from the group consisting of closed captioning, on screen commands, channel identification information, captions for displayed persons, scoreboards, stock and news tickers, logos and other images not originally in the video.

15. The device according to claim 9, wherein the locator includes an area selector for selecting an area in the image of each of the frames for placing an overlay element and an occlusion calculator for determining for the selected area what percentage the overlay element overlaps the at least one desirable viewing area, the locator placing the overlay element in the selected area of the image if the percentage is below a maximum allowed predetermined percentage of overlapping, the locator selecting another area in the image for placing the overlay element if the percentage is above the maximum allowed predetermined percentage of overlapping.

16. The device according to claim 15, wherein the occlusion calculator determines for the selected area what percentage the overlay element overlaps the at least one desirable viewing area using the equation:

$$\text{combination occlusion\_rate} = C1*\text{feature 1\_occlusion} + C2*\text{feature 2\_occlusion} + C3*\text{feature 3\_motion activity level}$$

where:
- C1 is a coefficient or weight factor that pertains to the importance of the feature 1 (face) areas of the image;
- feature 1_occlusion is the percentage of overlap of the feature 1areas by the current location of the overlay element;
- C2 is a coefficient or weight factor that pertains to the importance of the feature 2 (text) areas of the image;
- feature 2_occlusion is the percentage of overlap of the feature 2 areas by the current location of the overlay element; and
- C3 is a coefficient or weight factor that pertains to the importance of the feature 3 (high motion activity) areas of the image.

17. A receiver device for placing an overlay element in images of a digital video so that desirable viewing areas of the images are not occluded by the overlay element, the receiver device comprising:
- a signal isolator for isolating a video signal having a video portion and an overlay element portion from a received video signal transmission;
- a frame extractor for extracting frames from the video portion of the isolated video signal, each of the frames defining an image having at least one desirable viewing area;
- an image processor for analyzing the images of the frames to identify desirable viewing areas in the images of the frames; and
- an overlay element locator for selecting an area in the image for placing the overlay and if the area occludes a threshold amount of desirable viewing areas then selecting another area of the image which minimizes the occlusion of the desirable viewing areas.

18. The receiver device according to claim 17, wherein the at least one desirable viewing area includes a face area.

19. The receiver device according to claim 17, wherein the at least one desirable viewing area includes a text area.

20. The receiver device according to claim 17, wherein the at least one desirable viewing area includes high motion activity areas.

21. The receiver device according to claim 17, wherein the image processor measures motion activity in different areas of the frame.

22. The receiver device according to claim 17, wherein the overlay element is selected from the group consisting of closed captioning, on screen commands, channel identification information, captions for displayed persons, scoreboards, stock and news tickers, logos and other images not originally in the video.

23. The receiver device according to claim 17, wherein the locator includes an area selector for selecting an area in the image of each of the frames for placing an overlay element and an occlusion calculator for determining for the selected area what percentage the overlay element overlaps the at least one desirable viewing area, the locator placing the overlay element in the selected area of the image if the percentage is below a maximum allowed predetermined percentage of overlapping, the locator selecting another area in the image for placing the overlay element if the percentage is above the maximum allowed predetermined percentage of overlapping.

24. The receiver device according to claim 23, wherein the occlusion calculator determines for the selected area what percentage the overlay element overlaps the at least one desirable viewing area using the equation:

$$\text{combination occlusion\_rate} = C1*\text{feature 1\_occlusion} + C2*\text{feature 2\_occlusion} + C3*\text{feature 3\_motion activity level}$$

where:
- C1 is a coefficient or weight factor that pertains to the importance of the feature 1 (face) areas of the image;
- feature 1_occlusion is the percentage of overlap of the feature 1areas by the current location of the overlay element;
- C2 is a coefficient or weight factor that pertains to the importance of the feature 2 (text) areas of the image;
- feature 2_occlusion is the percentage of overlap of the feature 2 areas by the current location of the overlay element; and
- C3 is a coefficient or weight factor that pertains to the importance of the feature 3 (high motion activity) areas of the image.

25. The receiver device according to claim 17, wherein the receiver device comprises one of a television receiver and set-top box.

26. A transmitter device for placing an overlay element in images of a digital video so that desirable viewing areas of the images are not occluded by the overlay element, the transmitter device comprising:
- a video generator for generating a digital video;
- a frame extractor for extracting frames from the video, each of the frames defining an image having at least one desirable viewing area;
- an image processor for analyzing the images of the frames to identify desirable viewing areas in the images of the frames;
- an overlay element generator for generating an overlay element;
- an overlay element locator for selecting an area in the image for placing the overlay and if the area occludes a threshold amount of desirable viewing areas then selecting another area of the image which minimizes the occlusion of the desirable viewing areas; and
- a transmitter for transmitting a video signal of the video with the overlay element positioning information.

27. The transmitter device according to claim 26, wherein the at least one desirable viewing area includes a face area.

28. The transmitter device according to claim 26, wherein the at least one desirable viewing area includes a text area.

29. The transmitter device according to claim 26, wherein the at least one desirable viewing area includes high motion activity areas.

30. The transmitter device according to claim 26, wherein the image processor measures motion activity in different areas of the frame.

31. The transmitter device according to claim 26, wherein the overlay element is selected from the group consisting of closed captioning, on screen commands, channel identification information, captions for displayed persons, scoreboards, stock and news tickers, logos and other images not originally in the video.

32. The transmitter device according to claim 26, wherein the locator includes an area selector for selecting an area in the image of each of the frames for placing an overlay element and an occlusion calculator for determining for the selected area what percentage the overlay element overlaps the at least one desirable viewing area, the locator placing the overlay element in the selected area of the image if the percentage is below a maximum allowed predetermined percentage of overlapping, the locator selecting another area in the image for placing the overlay element if the percentage is above the maximum allowed predetermined percentage of overlapping.

33. The transmitter device according to claim 32, wherein the occlusion calculator determines for the selected area what percentage the overlay element overlaps the at least one desirable viewing area using the equation:

$$\text{combination occlusion\_rate} = C1 * \text{feature 1\_occlusion} + C2 * \text{feature 2\_occlusion} + C3 * \text{feature 3\_motion activity level}$$

where:
- C1 is a coefficient or weight factor that pertains to the importance of the feature 1 (face) areas of the image;
- feature 1_occlusion is the percentage of overlap of the feature 1areas by the current location of the overlay element;
- C2 is a coefficient or weight factor that pertains to the importance of the feature 2 (text) areas of the image;
- feature 2_occlusion is the percentage of overlap of the feature 2 areas by the current location of the overlay element; and
- C3 is a coefficient or weight factor that pertains to the importance of the feature 3 (high motion activity) areas of the image.

34. The transmitter device according to claim 26, wherein the transmitter device comprises a television broadcast transmitter.

* * * * *